US005241187A

United States Patent [19]

Ikeda et al.

[11] Patent Number: 5,241,187

[45] Date of Patent: Aug. 31, 1993

[54] REGISTRATION METHOD FOR SCREEN PRINTING AND APPARATUS INCLUDING ELONGATED SCREEN

[75] Inventors: Yoshinori Ikeda; Katsuki Nakanishi, both of Nagaokakyo, Japan

[73] Assignee: Muarta Manufacturing Co., Ltd., Japan

[21] Appl. No.: 955,654

[22] Filed: Oct. 2, 1992

[30] Foreign Application Priority Data

Oct. 4, 1991 [JP] Japan .................................. 2-285755

[51] Int. Cl.[5] ..................... G01N 21/86; G01B 11/00; B41F 15/00

[52] U.S. Cl. .................................... 250/548; 101/114; 356/401

[58] Field of Search ........................ 250/548, 559, 561; 356/399-401; 101/114

[56] References Cited

U.S. PATENT DOCUMENTS 3,766,635 10/1973 Cranston ............................ 228/108
4,813,351 3/1989 Pierson, Jr. .......................... 101/115
4,835,401 5/1989 Sajiki .................................. 250/548
5,138,667 8/1992 Roch et al. .......................... 250/548
5,163,367 11/1992 Newman .......................... 101/127.1
5,170,058 12/1992 Berasi et al. ........................ 250/548

FOREIGN PATENT DOCUMENTS 3-39461 6/1991 Japan .

*Primary Examiner*—David C. Nelms
*Assistant Examiner*—Michael Messinger
*Attorney, Agent, or Firm*—Ostrolenk, Faber, Gerb & Soffen

[57] ABSTRACT

A CCD camera is set under a print object having a registration hole, and a screen plate having a reference mark on its screen corresponding to the registration hole is arranged above the position of the print object. First, the amount of elongation of the screen is measured from a position of the reference mark in an unelongated state of the screen and that of the reference mark in a elongated state of the screen upon operation of a squeegee, and the shift amount between the registration hole and the reference mark is calculated from positions of the reference mark and the registration hole before printing This shift amount is corrected by the amount of elongation of the screen, and the screen plate is moved in response to the corrected shift amount to attain registration.

17 Claims, 3 Drawing Sheets

REGISTRATION METHOD FOR SCREEN PRINTING AND APPARATUS INCLUDING ELONGATED SCREEN

BACKGROUND OF INVENTION

The present invention relates to a registration method for screen printing, and an apparatus for carrying out the method.

In conventional screen printing, a print object is arranged under a screen plate and an image pickup camera such as a CCD camera is arranged above the screen plate. The shift amount between a registration hole which is provided in the screen and a registration mark which is formed on an upper surface of the print object is measured by this image pickup camera, thereby registering the screen plate and the print object. In this method, however, the camera located above the screen plate is interfered with by a squeegee which is moved across the screen plate, so that precise measurement of the shift amount became difficult.

On the other hand, Japanese Patent Publication Gazette No 3-39461 (1991) proposes a registration apparatus comprising a CCD camera which is set under a print object having two through holes for registration and a screen plate, having a screen with two registration marks corresponding to the through holes, which is arranged above the print object. In this case, the shift amounts are calculated from distances between reference points of the CCD camera and the registration marks of the screen as well as the through holes of the print object on x and y axes, so that the screen plate is moved to be automatically registered with the print object.

In this method, no problem of interference between the camera and a squeegee is caused since the camera is located under the print object.

However, with this registration method, the shift amounts between the reference points of the CCD camera and the registration marks of the screen are detected in an unelongated state of the screen, before operation of the squeegee. In practice, however, a screen 40 is elongated as shown in FIG. 5 upon operation of a squeegee 41, and hence a position (shown by a solid line in FIG. 5) of a mark a before printing differs from a position (shown by a two-dot chain line) during printing. Such elongation varies due to the pressure of the squeegee 41 and the expansibility of the screen 40. Even if the shift amounts are correctly measured before printing, misregistration shown by b and a of the printing position upon actual screen printing may occur.

SUMMARY OF THE INVENTION

Accordingly, a principal object of the present invention is to provide a registration method for screen printing which can accurately register a screen and print object in consideration of the elongation of a the screen.

Another object of the present invention is to provide a registration apparatus for screen printing, which can accurately and automatically register a screen with a print object.

In order to carry out the registration method of the invention, a screen plate is first set in a prescribed position and an image pickup apparatus is set under the screen plate, and the following setup steps are carried out. In the setup steps, the position of a reference mark which is provided on a screen is detected by the image pickup apparatus before printing, i.e., in an unelongated state of the screen. Then a squeegee is moved across the screen so that the position of the reference mark is detected by the image pickup apparatus in an elongated state of the screen.

The image pickup apparatus is preferably a CCD camera, for example, which can accurately recognize images with digital signals. Signals from the image pickup apparatus are inputted into a controller such as a microcomputer, which then calculates the shift amount of the reference mark resulting from the elongation of the screen, i.e., the amount of elongation of the screen.

Next the process is advanced in the following registration steps. First, the position of the reference mark provided on the screen before printing is recognized by the image pickup apparatus, and then the position of a registration part of the print object is recognized. The shift amount between the registration part of the print object and the reference mark of the screen is calculated by the controller from the recognized data. Then, the shift amount is corrected by the amount of elongation of the screen calculated in the setup steps. Assuming that x represents the shift amount between the registration part and the reference mark along an x axis and $\Delta x$ represents the amount of elongation of the screen along the x axis, the corrected shift amount is $x+\Delta x$.

The screen plate or the print object is moved in a direction for eliminating the as-detected shift amount, so that the screen plate and print object can be accurately registered with each other in consideration of the elongation of the screen.

According to the present invention, the registration part of the print object can be a simple through hole, a notch, or an edge of the print object, so far as the part can form a contrasting image on the image pickup apparatus. Also a part of a pattern which is formed on the screen can be used as the reference mark of the screen, or the screen may be provided with a portion, transmitting or not transmitting light, for the reference mark. More than one registration part and reference mark can be used with the shapes thereto not being restricted. A light source is preferably arranged under the print object or above the screen plate, so that the positions of the registration part and the reference mark can be clearly recognized by the image pickup apparatus. A three-axis (x, y, $\theta$) driving mechanism is preferably provided in order to move the screen plate or the print object in arbitrary directions on a plane.

When the registration part of the print object is formed by a through portion which allows the camera to recognize the reference mark on the screen located at the back thereof, it is possible for the camera to simultaneously recognize the reference mark and the registration part before printing. In this case, the shift amount between the reference mark and the through portion can be so directly measured that it is possible to decrease any measurement error, as compared with the case in which the camera recognizes the positions one by one. Moreover, arithmetic processing can be simplified since it is not necessary to calculate the shift amount as a difference with respect to a reference point of the camera.

According to the present invention, as hereinabove described, the amount of elongation of the screen upon operation of the squeegee is previously measured to correct the shift amount between the registration part of the print object and reference mark of the screen, whereby it is possible to accurately register the print object with the screen no matter how much the screen is elongated by the expansibility thereof or the pressure of the squeegee.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
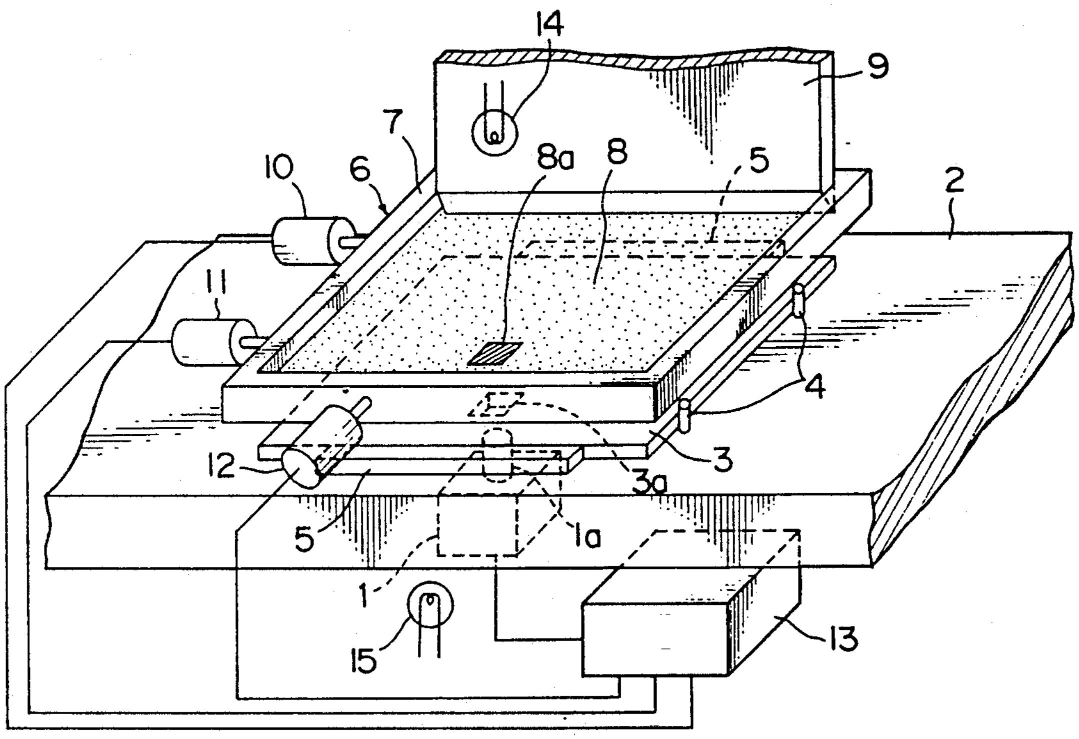
FIG. 1 is a perspective view showing a registration apparatus according to an embodiment of the present invention.

FIG. 1 illustrates a registration apparatus according to an embodiment of the present invention.

A CCD camera 1, which is an exemplary image pickup apparatus, is fixed on a horizontal printing table 2 so that its lens portion 1*a* is upwardly directed. Each print object 3, such as a printed circuit board, is independently carried onto the printing table 2. Stopper pins 4 which are from the raised and lowered surface of table 2 are adapted to stop the forward end surface of the print object 3. Guide plates 5 are adapted to guide both side surfaces of the object 3. Thus, object 3 is registered in a constant position on the table 2. In such a position, a registration hole 3*a*, which is a registration part formed in the object 3, is positioned above the lens portion 1*a* of the camera 1.

A screen plate 6 is horizontally arranged above the printing table 2. Acting rods of first and second actuators 10 and 11 are connected to a back surface of frame portion 7 of screen plate 6 and an acting rod of a third actuator 12 is connected a side surface which is adjacent to the back surface. These actuators 10 to 12 can drive the screen plate 6 along three axes x, y and θ on a horizontal plane. The actuators 10 to 12, which are formed by pulse motors having ball screw mechanisms, for example, are provided on support portions (not shown). An extensible screen 8 is stretched inside frame portion 7 of the screen plate 6, and a prescribed printing pattern (not shown) is formed on screen 8. Screen 8 is provided with a reference mark 8*a*, corresponding to the position of the registration hole 3*a*, which is located above the lens portion 1*a* of the camera 1. The screen plate 6 is further equipped with a squeegee 9, the lower edge of which slides along the screen 8.

Image pickup signals generated from the camera 1 are inputted into a controller 13, formed by a microcomputer, which detects the positions of the registration hole 3*a* and the reference mark 8*a* from the image pickup signals and memorizes the positions thereof. The controller 13 performs predetermined arithmetic processing on the basis of the signals received from the camera 1, to output drive signals to the actuators 10 to 12.

A transmitted illumination light source 14 and a reflected light source 15 are arranged to illuminate the upper surface of the screen plate 6 and lower surface of the print object 3 respectively, so that the camera 1 can clearly recognize contrast images of the hole 3*a* and the reference mark 8*a*.

Figure 2A:
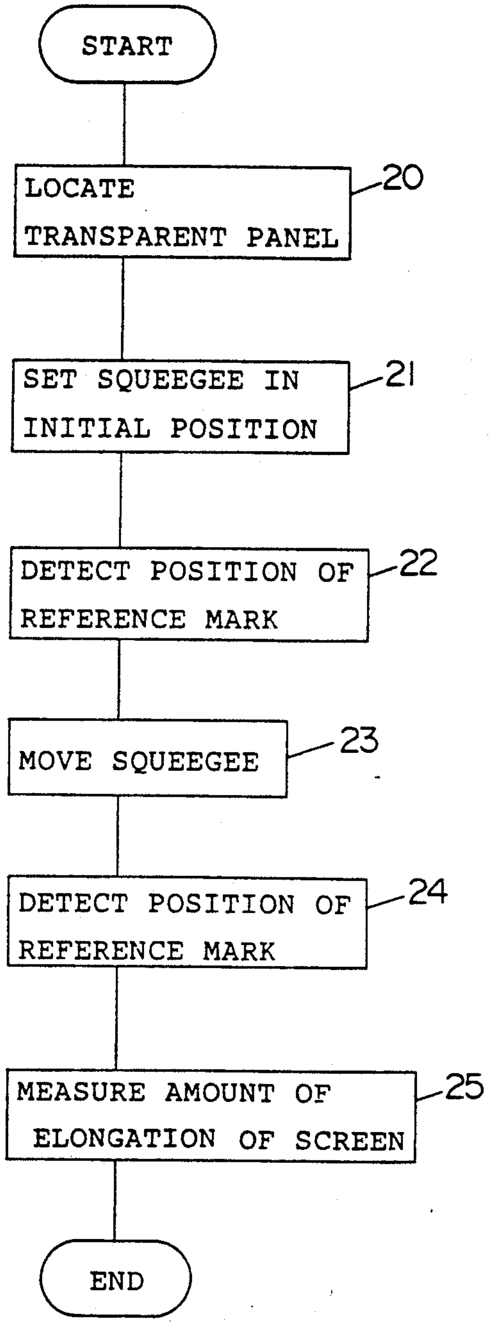
FIG. 2A is a flow chart of setup steps according to the present invention.
Figure 2B:
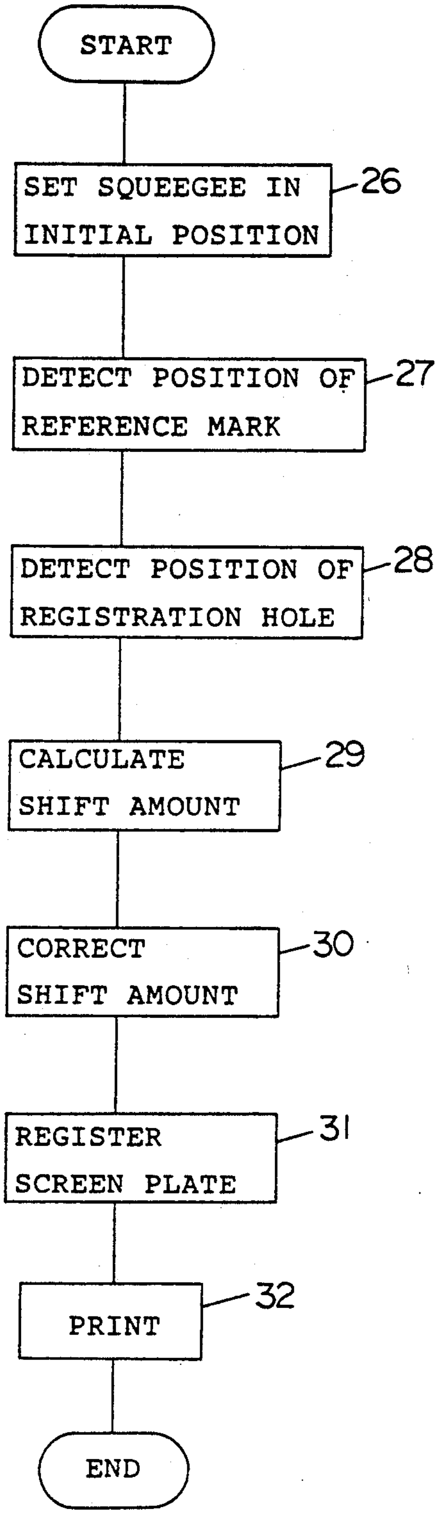
FIG. 2B is a flow chart of registration steps according to the present invention.

The inventive registration method is now described with reference to the flow chart shown in FIGS. 2A and 2B.

Figure 3A:
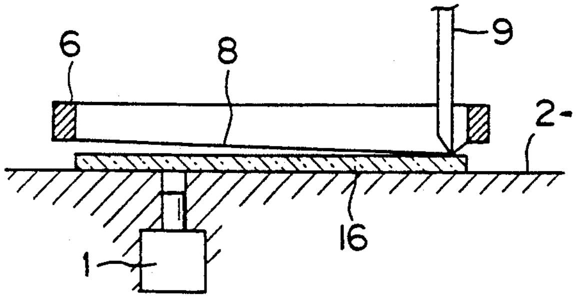
FIG. 3A is a sectional view of a registration apparatus in an initial position in the setup steps.
Figure 3B:
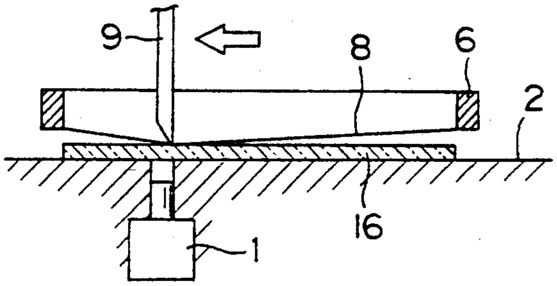
FIG. 3B is a sectional view of a registration apparatus in a halfway position in the setup steps.

First, a transparent panel 16 (FIGS. 3A and 3B) which has absolutely the same shape as the print object 3, is carried onto the printing table 2, and registered by the stopper pins 4 and the guide plates 5 (step 20). Then, the squeegee 9 is located in an initial position on the screen 8 as shown in FIG. 3A (step 21), so that the position of the mark 8*a* in an unexpanded state of the screen 8 is detected by the camera 1 through the panel 16 and this position is memorized (step 22). Then, the squeegee 9 is driven toward the position of the mark 8*a* (step 23), so that the position of the mark 8*a* in an expanded state of the screen 8 is detected by the camera 1 through the panel 16, as shown in FIG. 3B and this position is memorized (step 24). Thus, the amount of elongation of the screen 8 is measured from the shift amount between the two positions (step 25).

Although the transparent panel 16 having the same shape as the print object 3 is employed in the above description, the object 3 alone can be used if it is possible to see the screen 8 through the hole 3*a* provided in the object 3, since the positions of the mark 8*a* can still be detected by the camera 1 during operation of the squeegee 9. In any case, it is necessary to image the positions under conditions similar to those for elongation of the screen 8 in the actual printing steps. These are setup steps, which are carried out while no printing ink has been supplied to the screen 8.

Then, the process is advanced in the following registration steps. First, the squeegee 9 is located on the initial position of the screen 8 (step 26), so that the mark 8*a* of the screen 8 is detected by the camera 1 before printing and its position is memorized (step 27). Thereafter the object 3 is carried onto the table 2 and stopped by the stopper pins 4 and the guide plates 5, so that the hole 3*a* of the object 3 is detected by the camera 1 and its position is memorized (step 28). Then, the shift amount along the three axes x, y and θ is calculated from the two positions (step 29).

Figure 4:
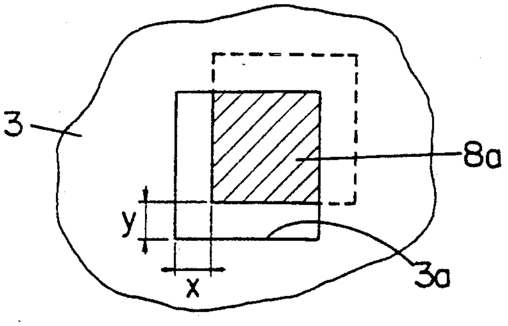
FIG. 4 illustrates a registration hole and a reference mark, which are detected by a camera.
Figure 5:
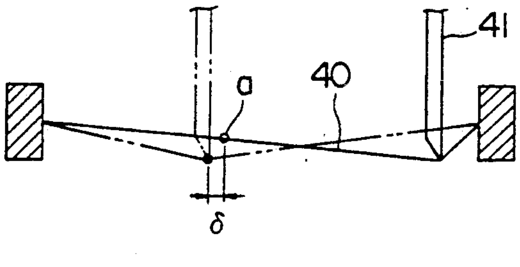
FIG. 5 illustrates the conventional state of elongation of a screen following movement of a squeegee.

When the print object 3 is provided with the hole 3*a*, it is possible to detect the mark 8*a* through hole 3*a*, whereby the positions of the mark 8*a* and the hole 3*a* can be simultaneously recognized after the object 3 is placed on the table 2. In this case, the shift amount between the mark 8*a* and the hole 3*a* can be directly measured as shown in FIG. 4. Thus it is possible to decrease any measurement error, as compared with the case of separately recognizing the two positions by the camera 1. Moreover, arithmetic processing is simplified since it is not necessary to calculate the shift amount between the mark 8*a* and the hole 3*a* with respect to a reference point of the camera 1.

Thereafter the as-detected shift amount is corrected by the amount of elongation of the screen 8 obtained in the setup steps (step 30). Assuming that the shift amount between the mark 8*a* and the hole 3*a* is expressed as (x, y and θ ) and the amount of elongation of the screen 8 is expressed as ($\Delta x$, $\Delta y$, and $\Delta\theta$), for example, the corrected shift amount is ($x+\Delta x$, $y+\Delta y$, $\theta+\Delta\theta$).

The actuators 10 to 12 are driven in directions for decreasing the aforementioned shift amount, so as to register the screen plate 6 (step 31). After the registration is completed, a printing ink is supplied on the screen 8 and the squeegee 9 is moved across the screen (step 32), so that screen printing can be precisely carried out on a predetermined position of the print object 3.

Although the screen plate 6 is moved for registration in the aforementioned embodiment, the table 2 supporting the object 3 may alternatively be moved by driving apparatuses which are similar to the actuators 10 to 12.

In the case of screen printing, displacement in ink transfer may be caused not only by the expansion of the screen 8 following movement of the squeegee 9, but also by viscosity of printing ink or deterioration of the screen 8. If a transparent or semi-transparent sheet or plate is prepared in place of the object 3 to be preliminarily printed, it is possible to observe such displacement in transfer of the printing ink from the screen 8 to the sheet or plate. Thus, it is possible to manage viscosity of the ink and the state of deterioration of the screen 8, as well as to correct misregistration following ink transfer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A registration method for screen printing using an image pickup apparatus disposed below a print object having a registration part and a screen plate, the screen plate including a screen, arranged over said print object, the screen having a reference mark, said method comprising the steps of:

detecting a position of said reference mark disposed on the screen by said image pickup apparatus;

moving a squeegee across the screen, elongating the screen;

detecting a position of said registration part of said print object by said image pickup apparatus;

measuring an amount of elongation of the screen;

inputting the positions of said reference mark and said registration part into a controller which calculates a shift amount between said registration part and said reference mark resulting from the elongation of the screen;

correcting said shift amount by said amount of elongation of said screen; and moving at least one of said screen plate and said print object in response to the corrected shift amount to accurately register said screen plate and said print object prior to printing.

2. A registration method for screen printing in accordance with claim 1, wherein said registration part provided in said print object comprises a hole through which said image pickup apparatus detects the position of said reference mark located in the print object.

3. A registration method for screen printing in accordance with claim 1, wherein said image pickup apparatus is a CCD camera.

4. A registration method for screen printing in accordance with claim 3, wherein said CCD camera is fixed to a horizontal printing table and includes a lens portion upwardly directed toward the print object which is placed on said printing table.

5. A registration method for screen printing in accordance with claim 4, wherein said printing table is provided with stopper pins which can be raised and lowered to stop a forward end surface of said print object placed on said printing table and guide plates for guiding both side surfaces of said print object.

6. A registration method for screen printing in accordance with claim 1, wherein a light source for transmitting illumination is arranged above said screen plate.

7. A registration method for screen printing in accordance with claim 1, wherein a light source for reflecting illumination is arranged under said print object.

8. A registration method for screen printing in accordance with claim 1, wherein a three-axis driving mechanism is provided for moving said screen plate or said print object on a horizontal plane.

9. A registration method for screen printing in accordance with claim 8, wherein said steps of inputting and correcting said shift amount comprise inputting image pickup signals of said reference mark detected by said image pickup apparatus into the controller, which controls said three-axis driving mechanism to move said at least one of said screen plate and said print object according to said signals.

10. A registration apparatus for screen printing comprising:

a printing table having an upper surface for receiving and supporting a print object in a constant position on said table, the print object including a registration part;

a screen plate arranged above said print object, said screen plate having a screen provided with a reference mark;

an image pickup apparatus having a lens portion, fixed below said printing table to upwardly direct the lens portion towards said printing table, for detecting the position of said registration part and said reference mark;

a squeegee which is moveable across said screen to elongate the screen;

a controller for receiving image pickup signals corresponding to the detected positions of said registration part and said reference mark, and for calculating a shift amount therebetween from the image pickup signals received from said image pickup apparatus; and a driving mechanism for horizontally moving said screen plate on said printing table according to signals outputted from said controller.

11. A registration apparatus for screen printing in accordance with claim 10, wherein said registration part provided in said print object comprises a hole through which said image pickup apparatus detects the position of said reference mark located in the print object.

12. A registration apparatus for screen printing in accordance with claim 10, wherein said image pickup apparatus is a CCD camera.

13. A registration apparatus for screen printing in a accordance with claim 10, wherein said print object has a forward end and side surfaces, said printing table is provided with stopper pins which can be raised and lowered to stop the forward end surface of said print object placed on said printing table and guide plates for guiding both side surfaces of said print object.

14. A registration apparatus for screen printing in accordance with claim 10, wherein a light source for transmitting illumination is arranged above said screen plate.

15. A registration apparatus for screen printing in accordance with claim 10, wherein a light source for reflecting illumination is arranged under said print object.

16. A registration apparatus for screen printing in accordance with claim 10, wherein said driving mechanism is a three-axis driving mechanism.

17. A registration apparatus for screen printing in accordance with claim 10, wherein image pickup signals of said reference mark which is detected by said image pickup apparatus are inputted into said controller which controls said driving mechanism to move said screen plate according to said signals.

* * * * *